United States Patent
Mehus et al.

(10) Patent No.: US 7,694,589 B2
(45) Date of Patent: Apr. 13, 2010

(54) LOW AND EMPTY PRODUCT DETECTION USING LOAD CELL AND LOAD CELL BRACKET

(75) Inventors: Richard J. Mehus, Richfield, MN (US); Bruce W. Weber, Stillwater, MN (US); Ben J. Wiltsie, Eagan, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 11/954,425

(22) Filed: Dec. 12, 2007

(65) Prior Publication Data

US 2009/0151474 A1   Jun. 18, 2009

(51) Int. Cl.
G01L 1/26 (2006.01)
G01G 19/30 (2006.01)
G07F 11/00 (2006.01)

(52) U.S. Cl. .............. 73/862.52; 222/77; 177/25.11; 221/6

(58) Field of Classification Search ........... 222/77; 177/25.11; 73/862.52; 221/6
See application file for complete search history.

(56) References Cited

U.S. PATENT DOCUMENTS

| | | | |
|---|---|---|---|
| 33,861 A | 12/1861 | Whitney |
| 1,985,615 A | 12/1934 | Mitchell |
| 2,219,597 A | 10/1940 | Lutz |
| 2,319,739 A | 5/1943 | Kessler |
| 2,333,791 A | 11/1943 | Hutchinson, Jr. |
| 3,091,327 A | 5/1963 | Lalley |
| 3,136,157 A | 6/1964 | Seed et al. |

(Continued)

FOREIGN PATENT DOCUMENTS

DE   100 39 408 A1   12/2001

(Continued)

OTHER PUBLICATIONS

Office Action dated Oct. 28, 2008 for U.S. Appl. No. 10/435,454, (6 pages).

(Continued)

*Primary Examiner*—Lisa M Caputo
*Assistant Examiner*—Jonathan Dunlap
(74) *Attorney, Agent, or Firm*—Shumaker & Sieffert, P.A.

(57) ABSTRACT

A system and method detect when a product container from which a product is dispensed is empty or nearly empty, and provides a notification of the product status. The system includes a load cell that deflects at a first rate of distance per unit load when a load less than a critical load is positioned to be weighed by the load cell, and a load cell bracket positioned such that the free end of the load cell contacts the load cell bracket when a load substantially equal to or greater than the critical load is positioned to be weighed by the load cell. The load cell bracket may prevent the load cell from further deflection, or it may permit deflection of the load cell at a second rate of distance per unit load when the load cell is in contact with the load cell bracket. The system may generate an out-of-product notification when the amount of product dispensed is substantially equal to zero, a low product notification when the amount of the product remaining is less than a threshold weight or a proof-of-delivery notification.

14 Claims, 9 Drawing Sheets

U.S. PATENT DOCUMENTS

| | | | |
|---|---|---|---|
| 3,412,254 A | 11/1968 | Meyer-Doering et al. | |
| 3,526,334 A | 9/1970 | Ashton et al. | |
| 3,743,598 A | 7/1973 | Field | |
| 3,754,871 A | 8/1973 | Hessel et al. | |
| 3,760,166 A | 9/1973 | Adams et al. | |
| 3,772,193 A | 11/1973 | Nelli et al. | |
| 3,774,056 A | 11/1973 | Sample et al. | |
| 3,826,113 A | 7/1974 | Noraas et al. | |
| 3,826,408 A | 7/1974 | Berndt et al. | |
| 3,828,869 A | 8/1974 | Sellers | |
| 4,040,515 A | 8/1977 | Hessel et al. | |
| 4,046,996 A | 9/1977 | Williams et al. | |
| 4,076,146 A | 2/1978 | Lausberg et al. | |
| 4,199,001 A | 4/1980 | Kratz | |
| 4,211,517 A | 7/1980 | Schmid | |
| 4,241,400 A | 12/1980 | Kiefer | |
| 4,247,396 A | 1/1981 | Buesing | |
| 4,265,266 A | 5/1981 | Kierbow et al. | |
| 4,307,787 A | 12/1981 | Raboud et al. | |
| 4,353,482 A | 10/1982 | Tomlinson et al. | |
| 4,373,418 A | 2/1983 | Rhodes et al. | |
| 4,396,828 A | 8/1983 | Dino et al. | |
| 4,402,426 A | 9/1983 | Faulkner et al. | |
| 4,404,639 A | 9/1983 | McGuire et al. | |
| 4,482,785 A | 11/1984 | Finnegan et al. | |
| 4,486,910 A | 12/1984 | Saalmann et al. | |
| 4,509,543 A | 4/1985 | Livingston et al. | |
| 4,573,606 A | 3/1986 | Lewis et al. | |
| 4,597,091 A | 6/1986 | Blake | |
| 4,630,654 A | 12/1986 | Kennedy, Jr. | |
| 4,632,198 A | 12/1986 | Uchimura | |
| 4,660,667 A * | 4/1987 | Uchimura et al. | 177/164 |
| 4,676,399 A | 6/1987 | Burckhardt | |
| 4,690,230 A | 9/1987 | Uchimura et al. | |
| 4,690,305 A | 9/1987 | Copeland | |
| 4,697,243 A | 9/1987 | Moore et al. | |
| 4,707,848 A | 11/1987 | Durston et al. | |
| 4,711,370 A | 12/1987 | Goudy, Jr. et al. | |
| 4,756,321 A | 7/1988 | Livingston et al. | |
| 4,766,548 A | 8/1988 | Cedrone et al. | |
| 4,770,859 A | 9/1988 | Heiser, Jr. | |
| 4,826,661 A | 5/1989 | Copeland et al. | |
| 4,837,811 A | 6/1989 | Butler et al. | |
| 4,845,965 A | 7/1989 | Copeland et al. | |
| 4,848,381 A | 7/1989 | Livingston et al. | |
| 4,858,449 A | 8/1989 | Lehn | |
| 4,867,196 A | 9/1989 | Zetena et al. | |
| 4,908,190 A | 3/1990 | Maglio et al. | |
| 4,938,240 A | 7/1990 | Lakhan et al. | |
| 4,964,185 A | 10/1990 | Lehn | |
| 4,969,011 A | 11/1990 | Faull et al. | |
| 4,976,137 A | 12/1990 | Decker et al. | |
| 4,980,292 A | 12/1990 | Elbert et al. | |
| 4,999,124 A | 3/1991 | Copeland | |
| 5,014,211 A | 5/1991 | Turner et al. | |
| 5,014,877 A | 5/1991 | Roos | |
| 5,024,352 A | 6/1991 | Gmür et al. | |
| 5,036,479 A | 7/1991 | Prednis et al. | |
| 5,038,807 A | 8/1991 | Bailey et al. | |
| 5,040,699 A | 8/1991 | Gangemi | |
| 5,043,860 A | 8/1991 | Koether et al. | |
| 5,053,206 A | 10/1991 | Maglio et al. | |
| 5,064,094 A | 11/1991 | Roos et al. | |
| 5,115,842 A | 5/1992 | Crafts et al. | |
| 5,136,281 A | 8/1992 | Bonaquist | |
| 5,147,615 A | 9/1992 | Bird et al. | |
| 5,203,366 A | 4/1993 | Czeck et al. | |
| 5,219,224 A | 6/1993 | Pratt | |
| 5,222,027 A | 6/1993 | Williams et al. | |
| 5,240,326 A | 8/1993 | Evanson | |
| 5,268,153 A | 12/1993 | Muller | |
| 5,279,448 A | 1/1994 | Hanlin et al. | |
| 5,283,639 A | 2/1994 | Esch et al. | |
| 5,294,022 A | 3/1994 | Earle | |
| 5,316,195 A | 5/1994 | Moksnes et al. | |
| 5,322,571 A | 6/1994 | Plummer et al. | |
| 5,332,312 A | 7/1994 | Evanson | |
| 5,345,379 A | 9/1994 | Brous et al. | |
| 5,369,032 A | 11/1994 | Pratt | |
| 5,370,267 A | 12/1994 | Schroeder | |
| 5,389,344 A | 2/1995 | Copeland et al. | |
| 5,390,385 A | 2/1995 | Beldham | |
| 5,397,028 A | 3/1995 | Jesadanont | |
| 5,400,018 A | 3/1995 | Scholl et al. | |
| 5,404,893 A | 4/1995 | Brady et al. | |
| 5,407,598 A | 4/1995 | Olson et al. | |
| 5,411,716 A | 5/1995 | Thomas et al. | |
| 5,419,355 A | 5/1995 | Brennan et al. | |
| 5,427,748 A | 6/1995 | Wiedrich et al. | |
| 5,497,914 A | 3/1996 | Maltsis | |
| 5,500,050 A | 3/1996 | Chan | |
| 5,505,915 A | 4/1996 | Copeland et al. | |
| 5,556,478 A | 9/1996 | Brady et al. | |
| 5,580,448 A | 12/1996 | Brandreth | |
| 5,584,025 A | 12/1996 | Keithley et al. | |
| 5,584,079 A | 12/1996 | Wong et al. | |
| 5,609,417 A | 3/1997 | Otte | |
| 5,619,183 A | 4/1997 | Ziegra et al. | |
| 5,625,659 A | 4/1997 | Sears | |
| 5,625,908 A | 5/1997 | Shaw | |
| 5,636,008 A | 6/1997 | LoBiondo et al. | |
| 5,638,417 A | 6/1997 | Boyer et al. | |
| 5,671,262 A | 9/1997 | Boyer et al. | |
| 5,679,173 A | 10/1997 | Hartman | |
| 5,681,400 A | 10/1997 | Brady et al. | |
| 5,694,323 A | 12/1997 | Koropitzer et al. | |
| 5,695,091 A | 12/1997 | Winings et al. | |
| 5,724,261 A | 3/1998 | Denny et al. | |
| 5,745,381 A | 4/1998 | Tanaka et al. | |
| 5,757,664 A | 5/1998 | Rogers et al. | |
| 5,758,300 A | 5/1998 | Abe | |
| 5,759,501 A | 6/1998 | Livingston et al. | |
| 5,761,278 A | 6/1998 | Pickett et al. | |
| 5,762,096 A | 6/1998 | Mirabile | |
| 5,769,536 A | 6/1998 | Kotylak | |
| 5,777,895 A | 7/1998 | Kuroda et al. | |
| H1743 H | 8/1998 | Graves et al. | |
| 5,821,523 A | 10/1998 | Bunte et al. | |
| 5,826,749 A | 10/1998 | Howland et al. | |
| 5,827,486 A | 10/1998 | Crossdale | |
| 5,839,097 A | 11/1998 | Klausner | |
| 5,851,291 A | 12/1998 | Poterala et al. | |
| 5,861,881 A | 1/1999 | Freeman et al. | |
| 5,864,783 A | 1/1999 | Struck et al. | |
| 5,875,430 A | 2/1999 | Koether | |
| 5,885,446 A | 3/1999 | McGrew, Jr. | |
| 5,887,975 A | 3/1999 | Mordaunt et al. | |
| 5,897,671 A | 4/1999 | Newman et al. | |
| 5,902,749 A | 5/1999 | Lichtwardt et al. | |
| 5,913,915 A | 6/1999 | McQuinn | |
| 5,931,877 A | 8/1999 | Smith et al. | |
| 5,933,479 A | 8/1999 | Michael et al. | |
| 5,939,974 A | 8/1999 | Heagle et al. | |
| 5,945,910 A | 8/1999 | Gorra | |
| 5,956,487 A | 9/1999 | Venkatraman et al. | |
| 5,961,561 A | 10/1999 | Wakefield, II | |
| 5,967,202 A | 10/1999 | Mullen et al. | |
| 5,973,696 A | 10/1999 | Agranat et al. | |
| 5,974,345 A | 10/1999 | Buck et al. | |
| 5,975,352 A | 11/1999 | Spriggs et al. | |
| 5,979,703 A | 11/1999 | Nystrom | |
| 5,980,090 A | 11/1999 | Royal, Jr. et al. | |
| 5,987,105 A | 11/1999 | Jenkins et al. | |
| 5,992,686 A | 11/1999 | Cline et al. | |

| | | | |
|---|---|---|---|
| 6,003,070 A | 12/1999 | Frantz |
| 6,007,788 A | 12/1999 | Bellon et al. |
| 6,012,041 A | 1/2000 | Brewer et al. |
| 6,029,286 A | 2/2000 | Funk |
| 6,049,792 A | 4/2000 | Hart et al. |
| 6,061,668 A | 5/2000 | Sharrow |
| 6,073,124 A | 6/2000 | Krishnan et al. |
| 6,082,149 A | 7/2000 | Woods |
| 6,098,843 A | 8/2000 | Soberanis et al. |
| 6,120,175 A | 9/2000 | Tewell |
| 6,129,449 A | 10/2000 | McCain et al. |
| 6,133,555 A | 10/2000 | Brenn |
| 6,136,184 A | 10/2000 | King |
| 6,143,257 A | 11/2000 | Spriggs et al. |
| 6,164,189 A | 12/2000 | Anson |
| 6,167,358 A | 12/2000 | Othmer et al. |
| 6,220,312 B1 | 4/2001 | Hirsch et al. |
| 6,259,956 B1 | 7/2001 | Myers et al. |
| 6,321,204 B1 | 11/2001 | Kazami et al. |
| 6,330,499 B1 | 12/2001 | Chou et al. |
| 6,356,205 B1 | 3/2002 | Salvo et al. |
| 6,357,292 B1 | 3/2002 | Schultz et al. |
| 6,370,454 B1 | 4/2002 | Moore |
| 6,377,868 B1 | 4/2002 | Gardner, Jr. |
| 6,418,371 B1 | 7/2002 | Arnold |
| 6,438,471 B1 | 8/2002 | Katagishi et al. |
| 6,441,322 B1 | 8/2002 | Ash et al. |
| 6,463,940 B1 | 10/2002 | Thomas et al. |
| 6,472,615 B1 | 10/2002 | Carlson |
| 6,490,513 B1 | 12/2002 | Fish et al. |
| 6,547,097 B1 | 4/2003 | Cavallaro et al. |
| 6,561,381 B1 | 5/2003 | Osterheld et al. |
| 6,697,706 B2 | 2/2004 | Gardner, Jr. |
| 6,707,873 B2 | 3/2004 | Thompson et al. |
| 6,792,395 B2 | 9/2004 | Roberts |
| 6,896,140 B1 | 5/2005 | Perry |
| 6,987,228 B1 | 1/2006 | MacMichael et al. |
| 7,069,188 B2 | 6/2006 | Roberts |
| 7,128,215 B2 | 10/2006 | Danechi |
| 7,201,290 B2 | 4/2007 | Mehus et al. |
| 2001/0038018 A1 | 11/2001 | Bell et al. |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0014496 A1 | 2/2002 | Cline et al. |
| 2003/0033156 A1 | 2/2003 | McCall |
| 2003/0033396 A1 | 2/2003 | McCall |
| 2003/0043688 A1 | 3/2003 | Peterson et al. |
| 2003/0195656 A1 | 10/2003 | Gardner, Jr. et al. |
| 2004/0015269 A1 | 1/2004 | Jungmann et al. |
| 2004/0088076 A1 | 5/2004 | Gardner, Jr. et al. |
| 2004/0162850 A1 | 8/2004 | Sanville et al. |
| 2004/0220844 A1 | 11/2004 | Sanville et al. |
| 2004/0226755 A1* | 11/2004 | Pottebaum et al. ........ 177/25.13 |
| 2004/0226956 A1 | 11/2004 | Brooks |
| 2004/0226959 A1 | 11/2004 | Mehus et al. |
| 2004/0230339 A1 | 11/2004 | Maser et al. |
| 2004/0232163 A1 | 11/2004 | Reinsch et al. |
| 2004/0245284 A1 | 12/2004 | Mehus et al. |
| 2005/0065644 A1 | 3/2005 | Gardner, Jr. et al. |
| 2005/0072793 A1 | 4/2005 | Mehus et al. |
| 2005/0102059 A1 | 5/2005 | Gardner, Jr. et al. |
| 2005/0269348 A1* | 12/2005 | Limback et al. ............. 221/263 |
| 2006/0173576 A1* | 8/2006 | Goerg et al. ................ 700/236 |
| 2007/0154370 A1 | 7/2007 | Mehus et al. |

FOREIGN PATENT DOCUMENTS

| | | |
|---|---|---|
| GB | 2 052 251 A1 | 5/1980 |
| JP | 06226068 | 8/1994 |
| JP | 09066995 | 3/1997 |
| JP | 09066999 | 3/1997 |
| JP | 11-502932 A | 3/1999 |
| JP | 11156101 | 6/1999 |
| WO | WO 98/26704 | 6/1998 |
| WO | WO 03/059143 A1 | 7/2003 |

OTHER PUBLICATIONS

Presentation, "ECOLAB Aramark Uniform Services Joining Forces for Service Excellence", 69 pgs., 1998.
T-Jet 2000 PC "Wash-Aisle Productivity Manager Software Guide", ECOLAB Textile Care Division, 28584/4001/0399 (9207-4327), 29 pgs. 2000.
Nova Controls, "Sample Reports" 8 pages, 1997.
Sample Reports, Novalink System, 96-04620-00A, consisting of 9 pgs., 1995.
Nova Controls, Nova News, "Save Money and Gain Sales Features?", 1 pg. Aug. 12, 1992.
Novalink Overview Program Pricing, 1 page, 1996.
Orion Liquid Laundry Supply Dispenser. 5 pgs. Feb. 1989.
Novalink Laundry Information System, "ControlMaster Version 2.0 for Windows User's Guide", P/N. 20-05253-00, 39 pgs. 2000.
PerSyst Inc. "LDAS-2000 Remote Information Control and Management System for the Commercial Laundry and Vending Industry", 4 pgs.
PerSyst Inc. Dial-A-Wash Automatic Laundry Room Attendant for Apartment and Complex Laundry Rooms, 2 pgs.
iNtOUCH Water Treatment Information Management Solution Statement of Work Presented to: ECOLAB (draft form), Mar. 29, 1999, 59 pages.
Brochure, Novalink, "The Laundry Information System" from Nova Controls, 6 pgs., Dec. 13, 1995.
Diverlog-L Enhanced "DLE—Production Summary Reports", Diversey, 5 pgs, 1990.
Diverlog-L Enhanced "DLE—Set-up Report", Diversey, 7 pgs, 1990.
Diverlog-L Enhanced "DLE—Single Cycle Reports", Diversey, 5 pgs. 1990.
CLAX Diverflow System Advanced Central Dosing Technology for Laundries, 3 pgs. Sep. 10, 1999.
We'd like to make a couple of things perfectly Clear, Aquabalance Pool and Spa Management, Ecolab brochure, 4 pgs. 1998 Ecolab Inc.
White Paper, ECOLAB BALANCER. COM, MRE, 4 pgs. Jun. 4, 1997.
relax. We'Ve Got Your Pool Concerns Under Control, ECOLAB Water Care Services, 4 pgs. 1998 Ecolab, Inc.
International Search Report dated Feb. 16, 2005, 18 pgs.
U.S. Appl. No. 10/436,454, filed May 12, 2003, entitled, "Methods of Dispensing", Mehus et al.
U.S. Appl. No. 11/799,692, filed May 2, 2003, entitled, "Interchangeable Load Cell Assemblies", Mehus et al.
Office Action dated Jul. 24, 2007 for U.S. Appl. No. 10/843,219, (12 pages).
Office Action dated Jul. 24, 2007 for U.S. Appl. No. 10/843,230, (16 pages).
Office Action dated Aug. 14, 2007 for U.S. Appl. No. 10/436,454, (5 pages).
Office Action dated Nov. 28, 2007 for U.S. Appl. No. 10/843,230, (18 pages).
Office Action dated Jan. 10, 2008 for U.S. Appl. No. 10/843,219, (16 pages).
Office Action dated May 2, 2008 for U.S. Appl. No. 10/436,454, (6 pages).
Notice of Allowance dated May 1, 2008 for U.S. Appl. No. 10/843,219, 8 pages.
Office Action dated Jun. 17, 2008, for U.S. Appl. No. 10/843,230, (14 pages).
Office Action dated Sep. 4, 2008, for U.S. Appl. No. 10/843,230, (11 pages).
Office Action dated Mar. 20, 2009, for U.S. Appl. No. 10/436,454, (7 pages).

Office Action dated Mar. 27, 2009, for U.S. Appl. No. 10/843,230, (9 pages).

The International Search Report and the Written Opinion of the International Searching Authority, for corresponding patent applicaion No. PCT/US2008/055107, mailed May 25, 2009, 8 pages.

Office Action dated Oct. 22, 2009 for U.S. Appl. No. 10/436,454, (8 pages).

Final Office Action dated Nov. 2, 2009 for U.S. Appl. No. 10/843,230, (10 pages).

* cited by examiner

FIG. 10

LOW AND EMPTY PRODUCT DETECTION USING LOAD CELL AND LOAD CELL BRACKET

TECHNICAL FIELD

The present disclosure is directed to systems and methods for detecting when a product container is empty or nearly empty.

BACKGROUND

Product dispensers may be used to dispense a wide variety of products. In one example, cleaning chemicals, in the form of solutions, powders, solids or pastes are dispensed out of product containers to be used for cleaning a wide variety of objects, such as laundry or dishes. In many industrial or commercial applications, product dispensers are housed in locations away from employees, making monitoring the amount of chemical remaining in the product dispenser difficult. Previous systems have been designed to detect the amount of chemical remaining in a dispenser by means such as inductance sensing, float switches, flow meters, optical refraction systems and conductivity probes.

SUMMARY

In general, the invention is directed to a method for detecting when a product is exhausted or nearly exhausted, and providing a notification of the product status to a user. In one embodiment the invention is directed to a system comprising a load cell having a fixed end and a free end, wherein the free end of the load cell deflects at a first rate of distance per unit load when a load less than a critical load is positioned to be weighed by the load cell, and a load cell bracket positioned such that the free end of the load cell contacts the load cell bracket when a load substantially equal to or greater than the critical load is positioned to be weighed by the load cell, wherein the load cell deflects at a second rate of distance per unit load when the load cell is in contact with the load cell bracket, the second rate of distance per unit load being less than the first rate of distance per unit load. The load cell may generate product weight information associated with an amount of a product remaining in a product container. The system may also include a controller that determines an amount of the product dispensed from the product container during a dispensing cycle based on the product weight information received from the load cell. The controller may also generate an out-of-product notification when the determined amount of product dispensed is substantially equal to zero. The controller may also determine the amount of product remaining in the product container after a dispensing cycle based on the product weight information received from the load cell. The controller may also generate a low product notification when the determined amount of the product remaining is less than a threshold weight.

As another example, the invention is directed to a method comprising dispensing a product from a product container during at least one dispensing cycle, determining whether a product weight remaining in the product container after the at least one dispensing cycle is less than a critical weight, entering an out-of-product mode when the product weight is less than the critical weight and entering a proof of delivery mode when the product weight is not less than a critical weight. The method may also include generating a notification based on a determined amount of product dispensed during the dispensing cycle. The method may also include generating a low product notification when the determined amount of product dispensed is less than a low product threshold amount. The method may also include generating an out-of-product notification when the determined amount of product dispensed is substantially zero. The method may also include generating a proof of delivery notification when the amount of product dispensed during the at least one dispensing cycle satisfies a proof of delivery threshold.

The details of one or more embodiments of the invention are set forth in the accompanying drawings and the description below. Other features and advantages of the invention will be apparent from the description and drawings, and from the claims.

DETAILED DESCRIPTION

The system of the present invention detects when a product container from which a product is dispensed is empty or nearly empty, and provides a notification of the product status. The system of the present invention includes a load cell and a load cell bracket that enables weight measurements of product containers over a wide weight range using a single load cell. The system allows loads greater than the critical load to be positioned to be weighed by the load cell without damage to the load beam or the strain gauge. The load cell deflects at a first rate of distance per unit load when a load less than a critical load is positioned to be weighed by the load cell. The load cell bracket is positioned such that the free end of the load cell contacts the load cell bracket when a load substantially equal to or greater than a critical load is positioned to be weighed by the load cell. The load cell bracket may prevent the load cell from further deflection, or it may permit deflection of the load cell at a second rate of distance per unit load when the load cell is in contact with the load cell bracket. The system may further generate an out-of-product notification when the amount of product dispensed is substantially equal to zero, a low product notification when the amount of the product remaining is less than a threshold weight or a proof-of-delivery notification.

Load cells have a measurement precision that is limited by their maximum load capacity. For example, a load cell with a large maximum rated load may have low precision for, and thus be unable to accurately weigh, very small loads. For low and out-of-product alarms systems, it is desired to have highly precise measurements of the remaining product as the product container approaches empty. If the weight of the full product container is large, a load cell with a large capacity, and thus low precision, is needed to prevent possible damage to the load cell. For example, many product containers in institutional cleaning facilities contain multiple gallons, and thus multiple kilograms, of liquid when full, whereas the desired measurement precision as the product container nears exhaustion is on the gram scale. Therefore, a direct measurement system utilizing a load cell(s) must be able to support a large load when the product container is full and provide sufficient measurement precision as the product container nears exhaustion to ensure accuracy of low or out-of-product detection.

Additionally, in many industrial, institutional and commercial applications the product dispensers are located in difficult-to-access locations. The cleaning product is then transferred through pipes or tubes to the location of its use, for example by a washing machine, dish machine or chemical product dispenser. In certain applications, for example commercial dish machines, regulatory requirements may call for proof-of-delivery of a sanitizing solution for health and safety reasons.

Figure 1:
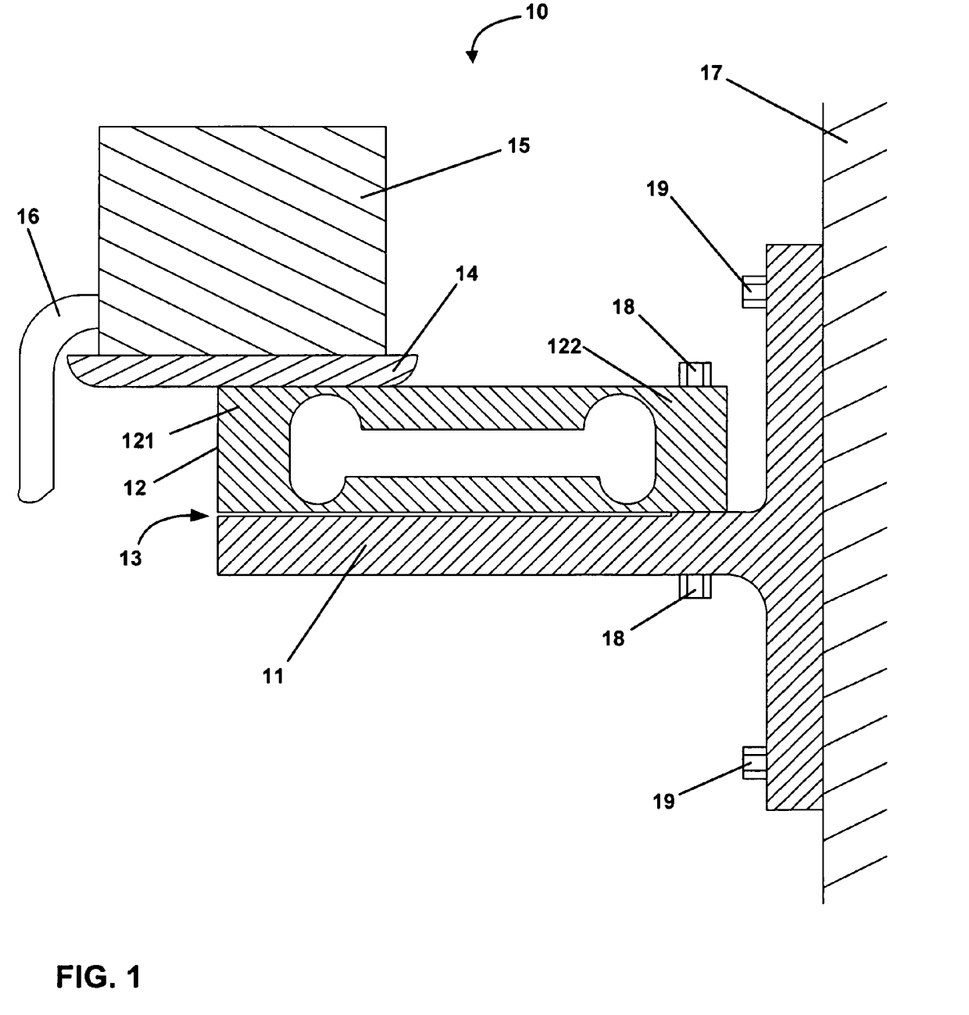
FIG. 1 is a diagram illustrating an example of a load cell and a load cell bracket.

FIG. 1 shows an example embodiment of a system 10 that monitors the amount of product remaining in a product container 15. The product may be any product that is dispensed, such as beverages, liquid cleaning solutions, solid cleaning compositions, paste cleaning compositions, powder cleaning compositions, chemical components of any of these, and the like. The product may be dispensed by any suitable method, for example, erosion by a diluent, pumping, siphoning, and the like. The product may be dispensed out of a tube 16 which delivers the product to the desired destination.

A load cell 12 determines the amount (e.g., the weight) of the product remaining in the product container 15. Multiple load cells may also be used. A product holder 14 supports product container 15 which in turn is supported by a free end 121 of load cell 12. Load cell 12 includes a beam (indicated generally by reference numeral 12) that deforms when a load is applied. Free end 121 of the beam deflects at a rated distance per unit load. An electronic strain gauge (not shown) is typically bonded onto the load beam. The strain gauge detects deformation of the load beam and generates corresponding electrical signals which may then be used to determine the weight of the load.

Figure 2:
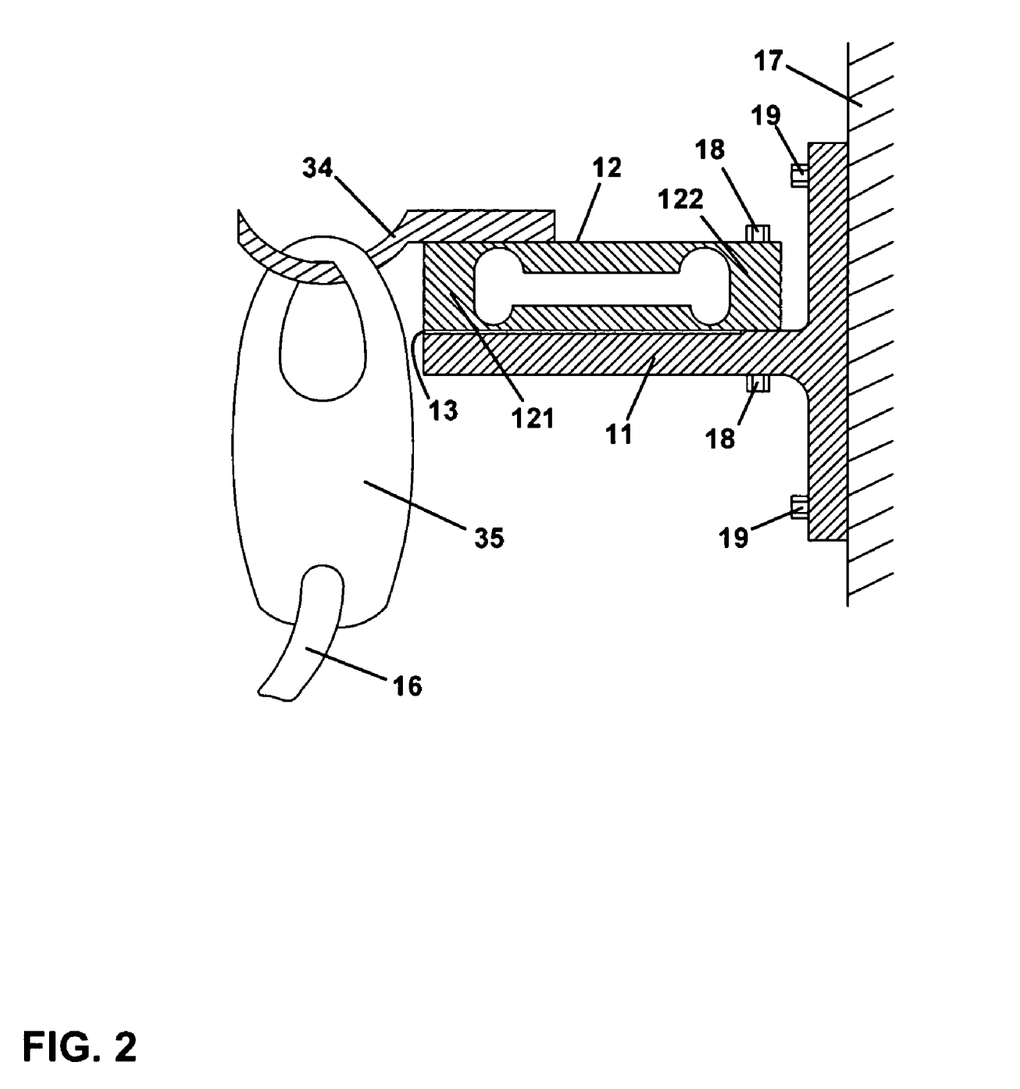
FIG. 2 is a diagram illustrating another example of a load cell and load cell bracket.

Product holder 14 may be any suitable shape or size depending upon the product container 15 to be supported. Product holder 14 is positioned to be supported by the free end 121 of load cell 12, so that the weight of product holder 14 and any object, such as a product container 15, supported by product holder 14 may be measured. In the embodiment shown in FIG. 1, product holder 14 has a dish-like shape suitable for supporting, for example, a pail or drum. Product holder 14 may also be substantially flat, bowl-shaped, or other any other shape depending upon the product container to be supported. In another embodiment, shown in FIG. 2, product holder 34 may be a hook for attaching and supporting a bag or sack of product 35. In this embodiment, the bag or sack of product 35 may hang from product holder 14. Although certain example product holders are shown and described herein, it shall be understood that the invention is not limited in this respect, and that the specific design of the product holder may vary depending upon the product container to be supported.

Load cell 12 measures the combined weight of the product holder 14, product container 15 and product inside the container 15. System 10 may be calibrated to take into account the weight of the product holder 14 and empty product container 15 when determining the amount (weight) of product remaining in the product container 15 or dispensed during a dispensing cycle. Thus, for purposes of the present application, although for ease of discussion the present application will refer to measuring the weight of the product remaining in product container or the amount of product dispensed during a dispensing cycle, it shall be understood that the system may be calibrated in various ways to either zero out the weight of the product holder 14 and empty product container 15 or to take these into account during processing when determining the weight of the remaining product.

Referring again to FIG. 1, load cell 12 is attached to load cell bracket 11 at a fixed end 122 by at least one load cell fastener 18. Load cell fastener 18 may be any suitable fastener, including, without limitation, bolts, screws, metal or plastic ties, adhesives, and the like.

When no load is applied to the load cell 12, a gap 13 separates the load cell 12 and the load cell bracket 11 at free end 121. A magnified view of gap 13, load cell 12 and load cell bracket 11 is shown and described herein with respect to FIG. 5. In one example, gap 13 is sized such that it is substantially equal to the rated deflection 131 of load cell 12 when the maximum rated load is applied. The rated deflection 131 of load cell 12 is the distance free end 121 of load cell 12 deflects when subject to a load equal to its maximum rated load. Gap 13 between load cell 12 and bracket 11 allows load cell 12 to deflect at its designed rate of distance per unit load when a load less than the maximum rated load is placed on load cell 12.

The size of gap 13 may be chosen such that when a load substantially equal to a predetermined critical load is placed on load cell 12, the free end 121 of load cell 12 contacts load cell bracket 11. The critical load may be chosen to be substantially equal to the maximum rated load of load cell 12. However, the critical load may be chosen to be either less than or more than the maximum rated load of load cell 12, and gap 13 sized accordingly, as described below.

Load cell bracket 11 is designed to prevent damage to load cell 12 from excessive deflection when load cell 12 is subjected to loads greater than its maximum rated load. For example, load cell bracket 11 may serve as a physical stop which prevents load cell 12 from deflecting past the point at which damage could occur. In this way, a single load cell 12 and load cell bracket 11 are able to measure a wide range of product sizes. For example, if load cell 12 is rated for 5 kg, load cell bracket 11 prevents load cell 12 from deflecting beyond its maximum rated deflection when the combined weight of the product, product container 15 and product holder 14 is above 5 kg. Thus, a 10 kg, 25 kg, 50 kg or other product container 15 greater than 5 kg may be placed on load cell 12 without damaging load cell 12. In this example, any time the remaining product is above 5 kg, load cell 12 will measure the weight to be 5 kg due to the physical stop and resulting limited deflection provided by load cell bracket 11. Once the remaining weight of the product drops below 5 kg, load cell 12 lifts off load cell bracket 11 and begins to accurately measure the weight of the remaining product. In this way, system 10 will obtain accurate weight measurements when the amount of product in product container falls below 5 kg and is therefore able to determine whether product container 15 is running low on product or is out of product.

In another example, contact between load cell 12 and load cell bracket 11 may function as a switch. For example, contact between load cell 12 and load cell bracket 11 may close the switch. This may occur when a product container 15 containing sufficient product such that the weight of the product, product container 15 and product holder 14 is greater than the critical load is placed on product holder 14. The switch would then open when the weight of the product, product container 15 and product holder 14 is less than a critical load, at which point load cell 12 ceases to contact load cell bracket 11. The opening of the switch may initiate a weight measurement algorithm.

Figure 5:
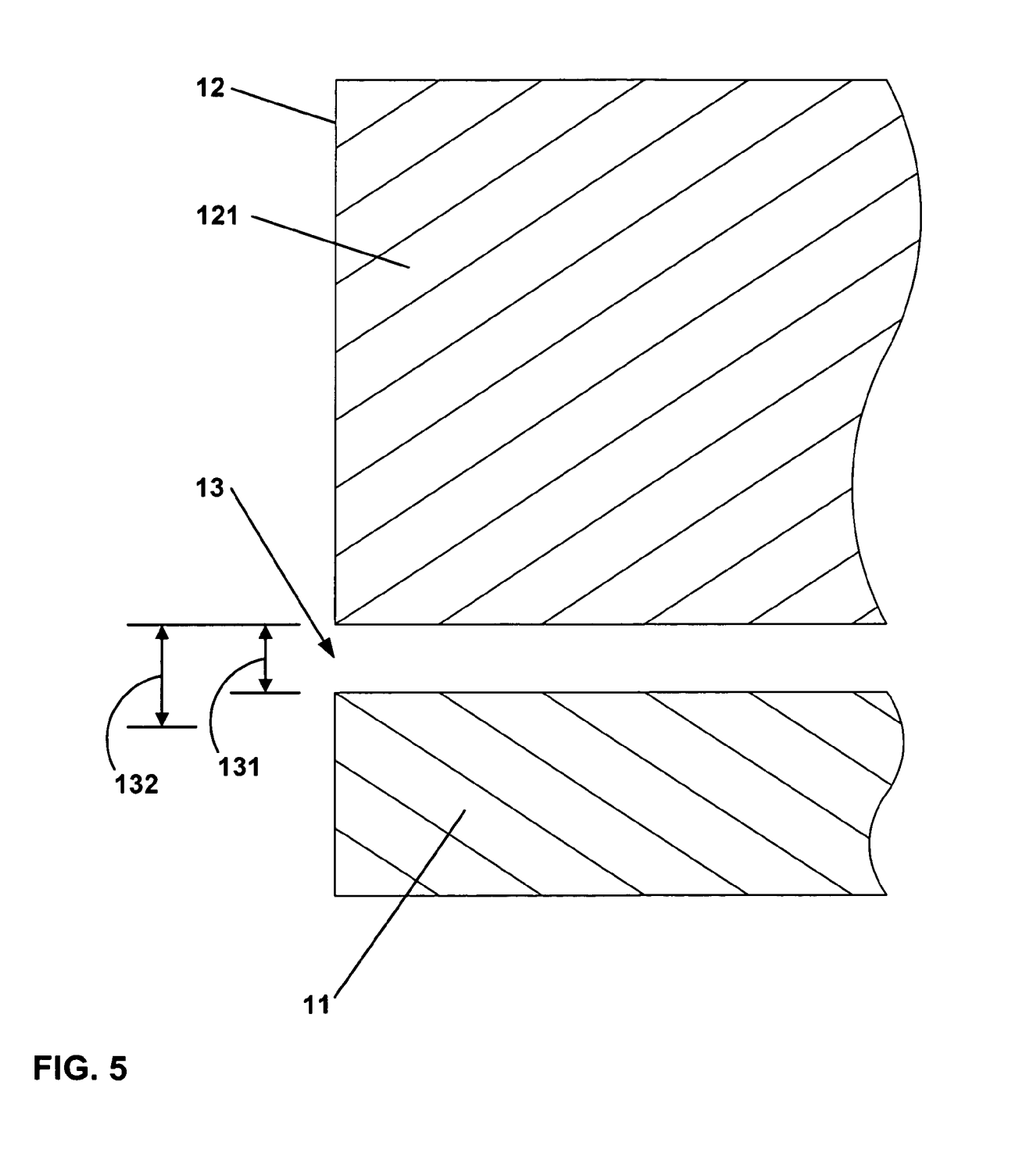
FIG. 5 is a diagram illustrating a magnified view of an example load cell and load cell bracket.

In another example, load cell bracket 11 may permit further deflection of the load cell 12 when a load greater than the critical load is placed on load cell 12. In other words, the combined load cell 12/bracket 11 that results when load cell 12 comes into contact with load cell bracket 11 may further deflect. Depending on its rating, a load cell 12 may deflect from 150% to up to 300% of its rated deflection without damaging the load cell strain gauge. The maximum distance the load cell 12 is able to deflect without damage is defined as its maximum deflection. FIG. 5 shows, for example, a maximum deflection 132 that is approximately 150% of the rated deflection 131 of load cell 12. In this example, the rate of deflection per unit load of the combined load cell 12/bracket 11 may be less than the rate of deflection per unit load of load cell 12 alone. In this way, load cell bracket 11 may serve to extend the range of weights that load cell 12 may be subjected to without resulting in damage to the load beam or the load cell strain gauge.

When bracket 11 allows for combined deflection of the load cell 12 and bracket 11, the output of load cell 12 may not accurately reflect the weight of the product when load cell 12 is in contact with load cell bracket 11. Because the rate of deflection per unit load may be less than when load cell 12 is supported by load cell bracket 11, the deflection distance will no longer represent the same weight as when load cell 12 is not in contact with load cell bracket 11. For example, a load cell 12 with a rated load of 5000 g may have a rated deflection of 0.040 inches, thus having a rate of deflection of 0.0000080 inches/gram. When a load of 5000 g is placed on load cell 12, it will deflect 0.040 inches. When a load of 2500 g is placed on load cell 12, load cell 12 will deflect 0.020 inches. However, when a load of 7500 g is placed on load cell 12, load cell 12 will contact load cell bracket 11, and the rate of deflection of the combined load cell and load cell bracket will be less than the rate of load cell 12 alone, and the total deflected distance of load cell 12 contacting load cell bracket 11 will be less than if load cell 12 alone received a load of 7500 g. Thus, the load measured by load cell 12 may be less than the true load of 7500 g.

Figure 3:
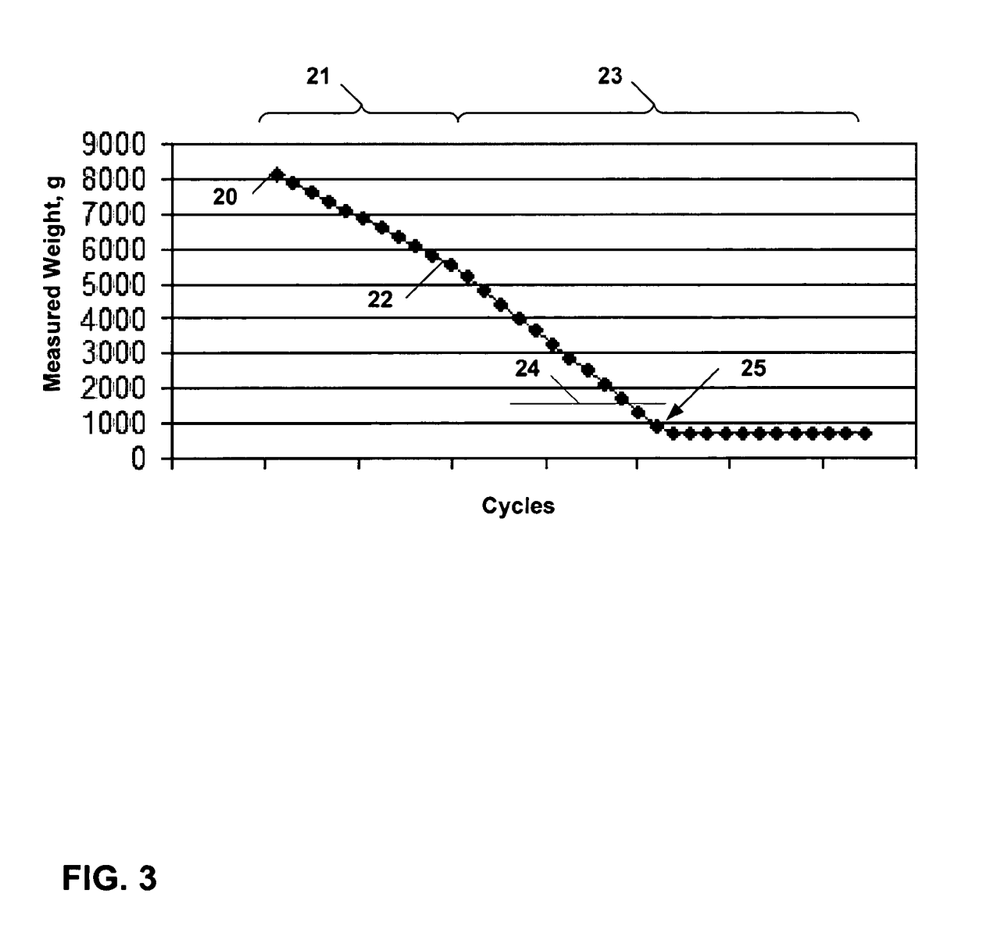
FIG. 3 is a chart illustrating weight data generated by a controller over several dispensing cycles.

FIG. 3 is a graph illustrating a relationship between measured weight and number of dispense cycles for an example load cell and load cell bracket combination. In this example, the measured weight of the product holder, product container and product is measured and output after each dispensing cycle. The load cell system used in this example has been designed with a critical load of 5000 g. Initially, a new container is loaded and the load cell reads a value 20 corresponding to the weight of the new container. The weight of the product holder, product container and product is greater than the critical load of the load cell system, so the load cell contacts the load cell bracket. This reduces the deflection rate experienced by the load cell. The measured weight in this example may therefore not be the true weight of the product, product container and product holder. When the load cell is contacting the load cell bracket, the rate of deflection per unit load of the combined load cell and load cell bracket is lower than the rate of deflection per unit load of the load cell alone. Therefore, in contact region 21, where the load cell is contacting the load cell bracket, the measured weight is less than the actual weight of the product, product container and product holder. Additionally, the measured weight lost per cycle is lower than the actual weight lost. However, once the weight of the product, product container and product holder drops below a critical weight, designated by reference numeral 22, the load cell no longer contacts the load cell bracket and moves into non-contact region 23. In non-contact region 23, the free end of the load cell no longer contacts the load cell bracket, deflects as designed and accurately measures the weight of the product, product container and product holder. During non-contact region 23, then, controller also obtains an accurate measurement of the weight lost during a dispense cycle. Once the supply of product in product container is substantially exhausted, designated by reference numeral 25, the load cell senses no further weight change. At this point, the system may generate an out-of-product notification.

Alternatively or in addition, a threshold 24 may be set below which the system generates a low product notification. Threshold 24 may be any suitable threshold weight below which it is desired to generate a low product notification. Additionally, any suitable method of providing the low product notification may be used, such as audible notifications, visual notifications, text messages, pages, e-mails and the like, as described below in reference to FIG. 7.

Figure 4:
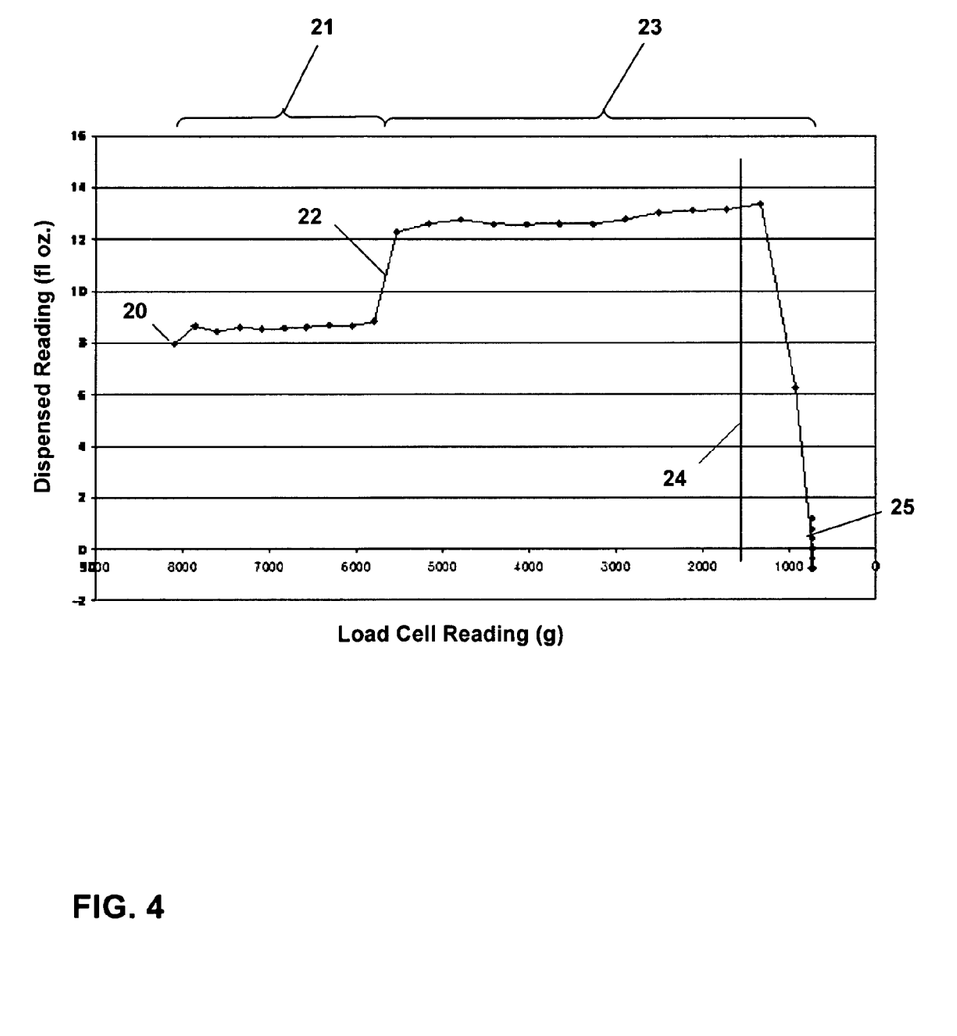
FIG. 4 is a chart illustrating dispensed readings vs. load cell readings over several dispensing cycles.

FIG. 4 is a graph illustrating an example relationship between the calculated dispensed measurement as determined by the system controller and the load cell reading for the example load cell and load cell bracket combination shown in FIG. 3. In this example, the load cell reading is shown on the abscissa, and the dispensed reading is shown on the ordinate. Once again in this example, the load cell system's critical load is 5000 g. Initially, a new container is loaded and the load cell obtains a reading during the first dispensing cycle, designated by reference numeral 20. In this example the combined weight of the product, product container and product holder is greater than the load cell system's critical load, so the load cell deflects and contacts the load cell bracket. Thus, the load cell reading at reference numeral 20 is less than the actual weight of the product. Throughout contact region 21, dispensed weight measurements based on the load cell readings result are less than the actual dispensed weight. Nonetheless, the load cell readings do indicate that some amount of product was dispensed. At a critical load, designated by reference numeral 22, the load cell lifts off of the load cell bracket and begins to operate in non-contact region 23. In non-contact region 23, the load cell readings reflect the actual weight of the remaining weight of the product, the product container and the product holder. The resulting calculated dispensed weight reflects the actual weight of the amount of product dispensed. When the product container is substantially empty of product, the product fails to dispense and the load cell measures substantially no weight change as indicated by region 25. The system controller may then generate an out-of-product alarm as described above. A threshold 24 may also be set below which a low product notification may be generated as described above.

To obtain the actual amount of product dispensed during the contact region, the reduced rate of deflection experienced by load cell/bracket combination may be calibrated. For example, the reduced rate of deflection experienced by load cell/bracket combination may be determined by calibrating load cell 12 and load cell bracket 11 using a range of loads that are less than would cause load cell 12 and load cell bracket 11 to deflect a distance that would damage load cell 12. The reduced reading of load cell 12 when contacting load cell bracket 11 may then be corrected for and an accurate measurement of the load may be obtained throughout the operable range of load cell 12 and load cell bracket 11. However, it shall be understood that this may not be necessary in all embodiments and that the invention is not limited in this respect.

In certain applications, accurate weight measurement may only be necessary when the amount of product remaining in product container 15 is relatively small, i.e., when product container 15 is approaching empty. Thus, any inaccuracy of the load cell 12 measurement when load cell 12 is contacting load cell bracket 11 may not be of concern. In these applications, the output of load cell 12 when it is contacting load cell bracket 11 may be used to provide proof-of-delivery. That is, if load cell 12 measures any change in the combined weight of the product, product container 15 and product holder 14 after a dispense request, the change may be used as proof that some amount of product was dispensed from the product container.

Regardless of whether load cell bracket 11 prevents further deflection of load cell 12, or reduces the rate of deflection of the load cell, the maximum load that may be placed on load cell 12 without potential damage is increased. Additionally, in both described cases, load cell 12 lifts off load cell bracket 11 when the load is less than a critical load. Thus, load cell 12 maintains its accuracy and precision at loads less than or equal to the critical load.

Figure 6:
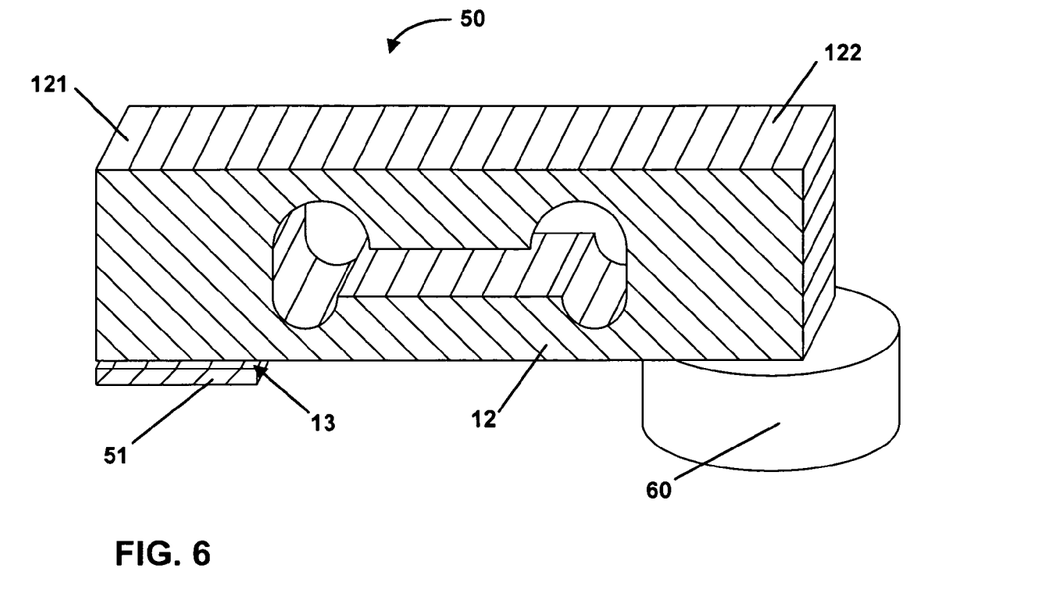
FIG. 6 is a diagram illustrating another example of a load cell and load cell bracket.

FIG. 6 is a schematic diagram of another embodiment of a load cell apparatus 50 which includes a load cell 12 and a load cell bracket 51, 60. Load cell 12 is connected to load cell bracket 60 on one end, fixed end 122. Any suitable fastener may be used to attach load cell 12 to load cell bracket 60, including, but not limited to, any fastener described above with respect to FIG. 1. Free end 121 of load cell 12 is not anchored to any support, but is free to deflect in response to an applied load. Load cell bracket 51 is located beneath free end 121 of load cell 12. Gap 13 between the bottom of load cell 12 and load cell bracket 51 is preferably substantially equal to the critical load. When a load above the critical load is placed on free end 121 of load cell 12, free end 121 of load cell 12 contacts load cell bracket 51. As described above, load cell bracket 51 may either prevent further deflection of load cell 12, or reduce the rate of deflection of load cell 12.

Figure 7:
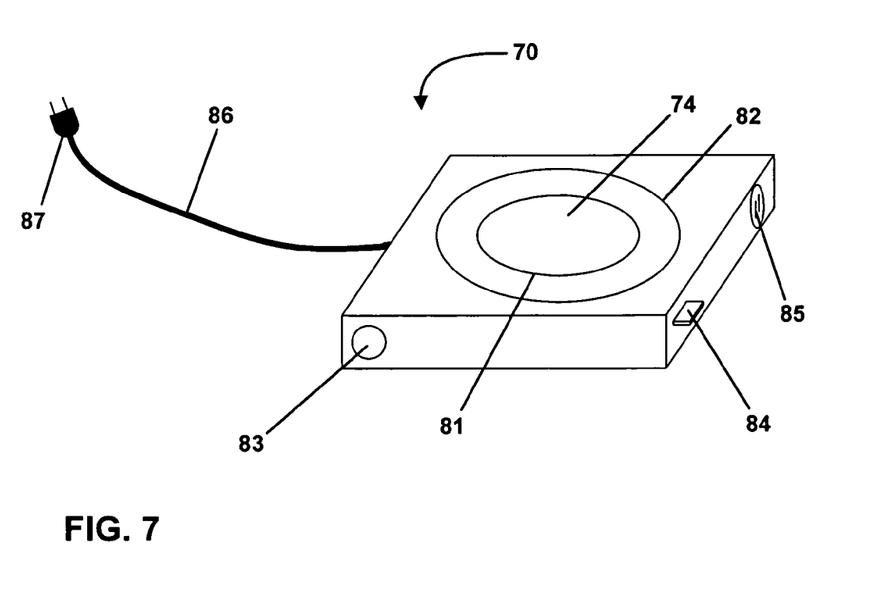
FIG. 7 is a diagram illustrating a scale utilizing a load cell and load cell bracket.

The load cell apparatus shown in FIG. 6 may be utilized in a system such as the system 70 pictured in FIG. 7. System 70 may be configured to rest on any suitable flat surface, such as a floor, table and the like. System 70 includes a product holder 74. Product holder 74 may optionally include grooves 81, 82 sized to receive product containers (not shown) of different sizes. For example, a larger groove 82 may be sized to receive 20 gallon buckets and a smaller groove 81 may be sized to receive 5 gallon buckets. Load cell 12 and load cell bracket 11 are located within the housing of system 70. Free end 121 of load cell 12 supports product holder 74, such that the weight of a product container placed on product holder 74 may be determined. When a product container is placed on product holder 74, load cell 12 will deflect. If the combined weight of product holder 74 and the product container is more than the critical load, load cell 12 will deflect such that it contacts load cell bracket 51. As described above, load cell bracket 51 may either prevent further deflection of load cell 12, or reduce the rate of deflection of load cell 12.

System 70 may also include one or more visible indicators 83 that display status information for system 70. Visible indicators 83 may be any suitable illumination source. One preferred illumination source is an LED. Visible indicators 83 may be configured to indicate the status of one or more of several different parameters. As one example, a flashing green LED may indicate the system is active, i.e. a product container is staged on product holder 74. The green LED may further indicate that the product container is filled with ample product such that the combined weight of the product, product container and product holder 74 is causing load cell 12 to deflect and contact load cell bracket 51.

In another example, another notification (such as a slowly flashing amber LED or other notification, for example) may indicate system 70 is in a mode in which product is staged and ready for a dispense request. The slowly flashing amber LED may further indicate that the combined weight of the product, product container and product holder 74 is such that load cell 12 is not in contact with load cell bracket 51. In this example, the slowly flashing amber LED indicates that load cell 12 is operating in its specified range.

In yet another example, a continuous amber light may indicate that the product container is nearly empty. The continuous amber light may be initiated once the combined weight of the product, product container and product holder 74 drops below a threshold value. This threshold value may be the critical load, i.e., when load cell 12 lifts off of the load cell bracket 51. Alternatively, the threshold value may be another value entered by a user, or a preset value above the zeroed weight of the product holder and a substantially empty product container.

In yet another example, a flashing red LED may indicate that product failed to dispense during a dispense request, and that the product is exhausted.

System 70 also includes a cord 86 and plug 87 for connecting to a power source, such as a wall outlet. Additionally, system 70 may include an outlet 85, which allows more than one system 70 to be connected in series. When more than one system 70 is connected in series, only one auditory notification may be generated if any of the product containers are out-of-product. Visible indicators 83 may then be used to display which individual system 70 is out-of-product.

System 70 may also include a switch 84, which may be used to toggle system 70 between providing low product notifications and out-of-product notifications, or both.

Figure 8:
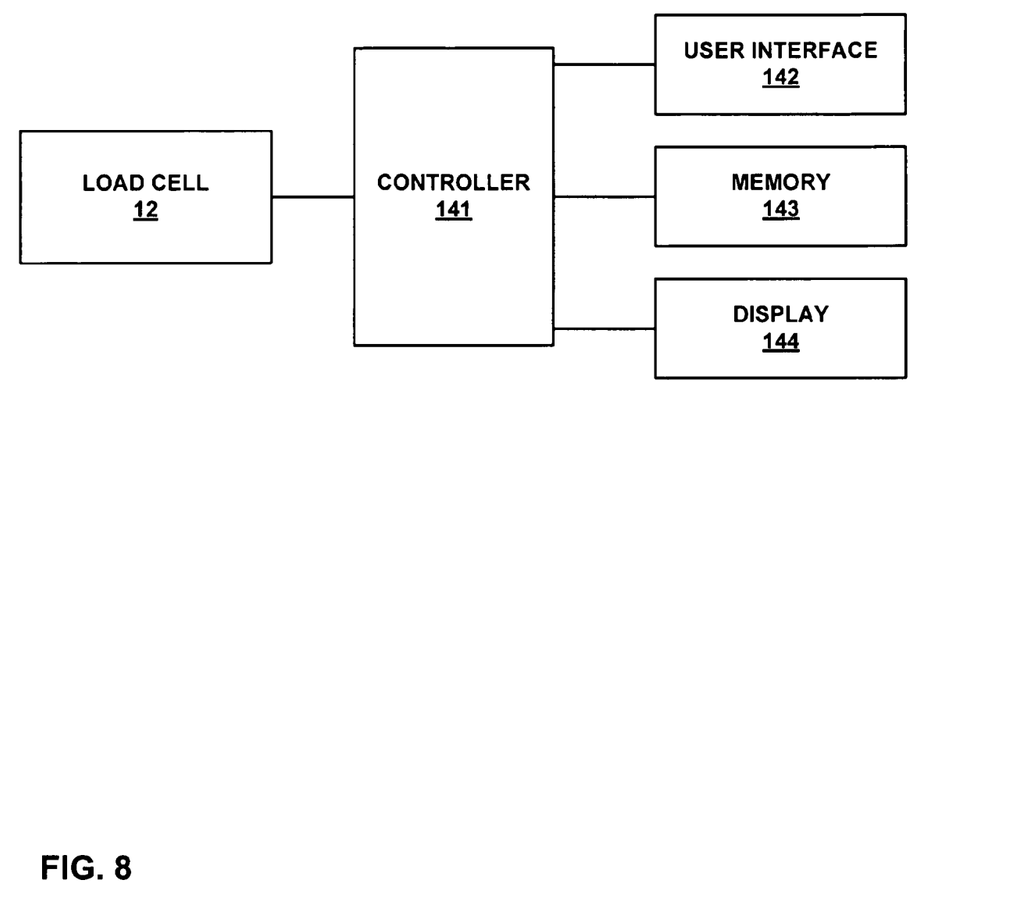
FIG. 8 is a block diagram illustrating example electronics for use with a load cell and load cell bracket.

FIG. 8 is a block diagram of the control electronics of system 10. FIG. 8 includes a load cell 12 connected to a controller 141 having an associated user interface 142, a memory 143 and display 144. Controller 141 includes a microprocessor and other appropriate hardware and software to process the weight information received from load cell 12. Memory 143 may store a digital data sheet that is programmed by the load cell manufacturer. This data sheet may contain strain gauge calibration data as well as strain gauge service information. The resident data sheet may be accessed by controller 143 for automatic strain gauge configuration.

Controller 141 determines any of several parameters based on the weight information received from the load cell 12. For example, controller 141 may determine the amount or weight of the product remaining in the product container, the amount of product dispensed during a dispensing cycle, whether the amount of product remaining in the product container is above or below a predetermined threshold value, whether the amount of product remaining in the product container satisfies a low product condition, and/or whether the amount of product remaining in the product container satisfies an out-of-product condition. Controller 141 may also determine if load cell 12 is in contact with load cell bracket 11. Controller 141 may also initiate notifications to be displayed on display 144, such as the visible indicators described above in reference to FIG. 7, or may generate audible alarms or notifications, text messages, pages, e-mails, or another appropriate method of notifying a user or technical service representative to a low-product or out-of-product event.

Figure 9:
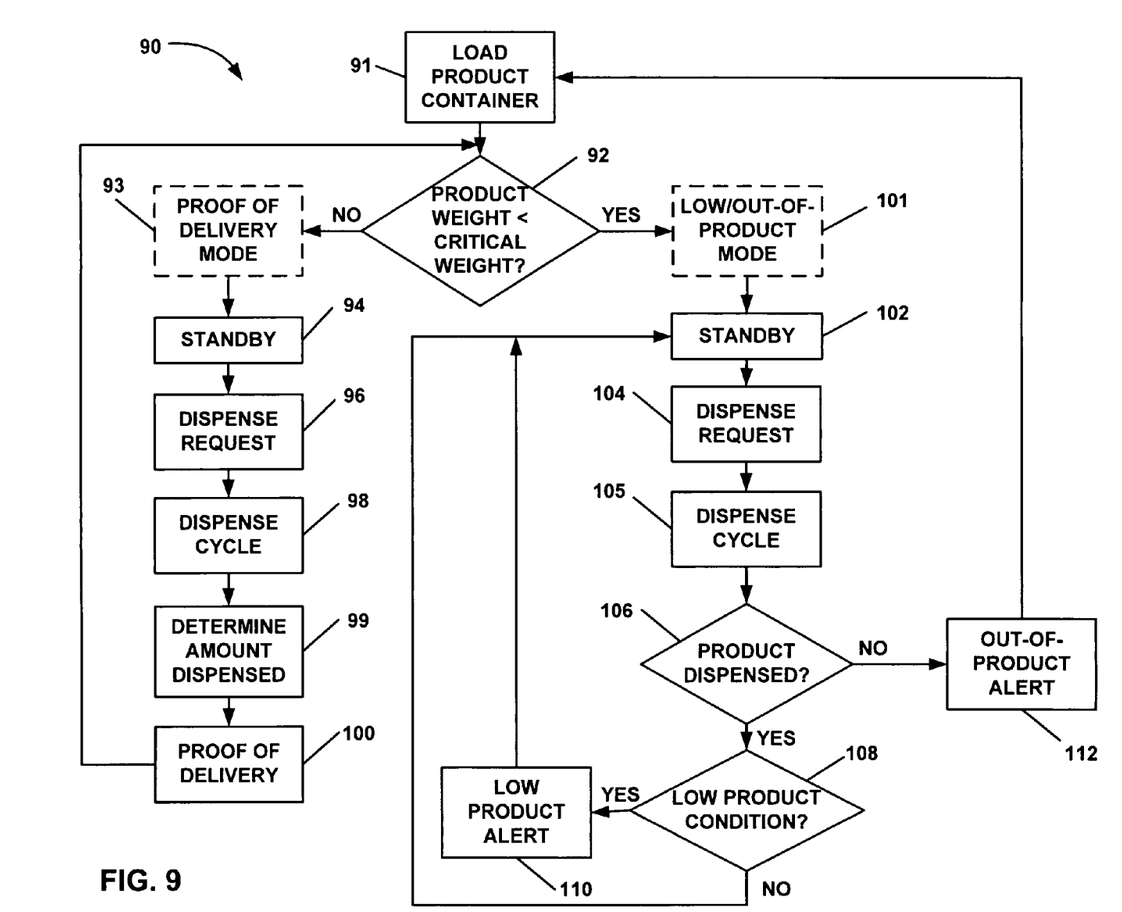
FIG. 9 is a flowchart illustrating an example process by which a controller monitors the supply of product in a container.

FIG. 9 is a flowchart illustrating a process 90 by which controller 141 processes product weight information received from a load cell. In this example system, the load cell bracket is designed such that the load cell/bracket combination continues to deflect at a reduced rate when the load cell is in contact with the load cell bracket.

Initially, the system may optionally be zeroed (not shown). The zeroing may be accomplished by weighing an empty product container and setting the controller to use the weight of the empty product container and/or product holder as its reference point. The zeroing may take place at the factory or after installation of the system at the site where it will be used. In yet another alternative, the controller may self-calibrate. In this alternative embodiment, after a product container is substantially empty of product and the controller senses no weight change, the weight of the substantially empty product container and/or product holder is used as the reference weight.

A product container containing product is loaded onto the product holder (91). The load cell deflects an amount corresponding to the weight of the product container at this time; any subsequent dispensing event will remove product from the product container and lighten the load on the load cell. Controller 141 receives the current product weight information from the load cell and compares it to the critical weight (92). If the product weight is not less than the critical weight (92), the load cell will deflect a sufficient distance to contact the load cell bracket. The system enters proof of delivery mode (93). The system enters standby (94) and waits for a dispense request (96).

Upon receipt of a dispense request (96), the system executes a dispense cycle (98). After completion of the dispense cycle, controller 141 determines either (1) that some amount of product was dispensed during the dispensing cycle based on the product weight information received from the load cell; or (2) the actual amount of product dispensed during the dispensing cycle (99). In the first example, the system is able to confirm that product was dispensed but is not able to accurately determine the actual amount of product dispensed. In the second example, the system may be calibrated to map the reduced rate of deflection that occurs when the load cell is in contact with the load beam with the actual weight of the remaining product.

To determine the amount of product dispensed (99), controller 141 receives the current product weight information from the load cell after completion of the dispense cycle and subtracts the corresponding current product weight from the previous product weight. Although as described above these may not correspond to the actual weight of product dispensed or to the current weight of the product remaining, any measured weight loss will constitute proof of delivery in that weight lost from the product container is evidence that product was dispensed. Controller 141 may then generate a proof of delivery message (100). Controller 141 then compares the current product weight with the critical weight (92). If the current weight is still greater than the critical weight, controller 141 remains in proof of delivery mode as just described.

If, on the other hand, the current product weight is less than the critical weight (92), the system enters low/out-of-product mode (101). As with proof of delivery mode, in low/out-of-product mode, controller 141 enters standby (102) and waits for a dispense request (104). Upon receipt of a dispense request (104), the controller initiates a measurement program to determine the amount of product dispensed during the dispensing cycle and the weight of the remaining product. The measurement program may optionally be preceded by a programmable delay. The delay may range from 1 to 300 seconds. The length of the delay may depend on the amount of product to be dispensed, the rate the product is dispensed and the like. This delay may also be implemented in proof of delivery mode. After the optional programmable delay, the measurement program commences and determines if any product was dispensed during the dispense cycle (106).

If no weight was lost during the dispense cycle, the controller determines that no product was dispensed and generates an out-of-product notification (112). The out-of-product notification may be any suitable visual and/or auditory notification, alert or alarm. The out-of-product notification may also be a text message displayed on an LCD or other display on user interface 142 (shown in FIG. 8). The out-of-product notification may also take the form of an e-mail, text message, cell phone or pager message or other electronic message to a user or service technician.

If the controller is configured to automatically re-zero itself, the re-zeroing may occur upon the generation of the out-of-product notification before a new product container is loaded into the product holder.

If the controller determines that the weight has changed during the product dispense cycle and that product has therefore been dispensed (106), the controller proceeds to determine if the weight of the remaining product satisfies a low product condition (108). The low product condition may be a threshold weight manually input by a user or service technician via the user interface or it may be a preprogrammed value. If the weight of the remaining product satisfies the low product condition, the controller generates a low product notification (110). The low product notification may be any suitable visual and/or auditory notification, alert or alarm. The low product notification may also be a text message displayed on an LCD or other display on user interface 142 (shown in FIG. 8). The low product notification may also take the form of an e-mail, text message, cell phone or pager message or other electronic message to a user or service technician. The system returns to standby (102) and waits for another dispense request (104).

If the controller determines that the remaining weight of the product does not satisfy the low product condition (108), the controller determines that there is sufficient product remaining in the product container and the system returns to standby (102) and awaits another dispense request (104).

In the case of visual or auditory notifications, the out-of-product notification (112) and the low product notification (110) may be distinct signals between which a user may easily discriminate. For example, the low product notification may be one color LED while the out of product notification may be a different color LED.

Figure 10:
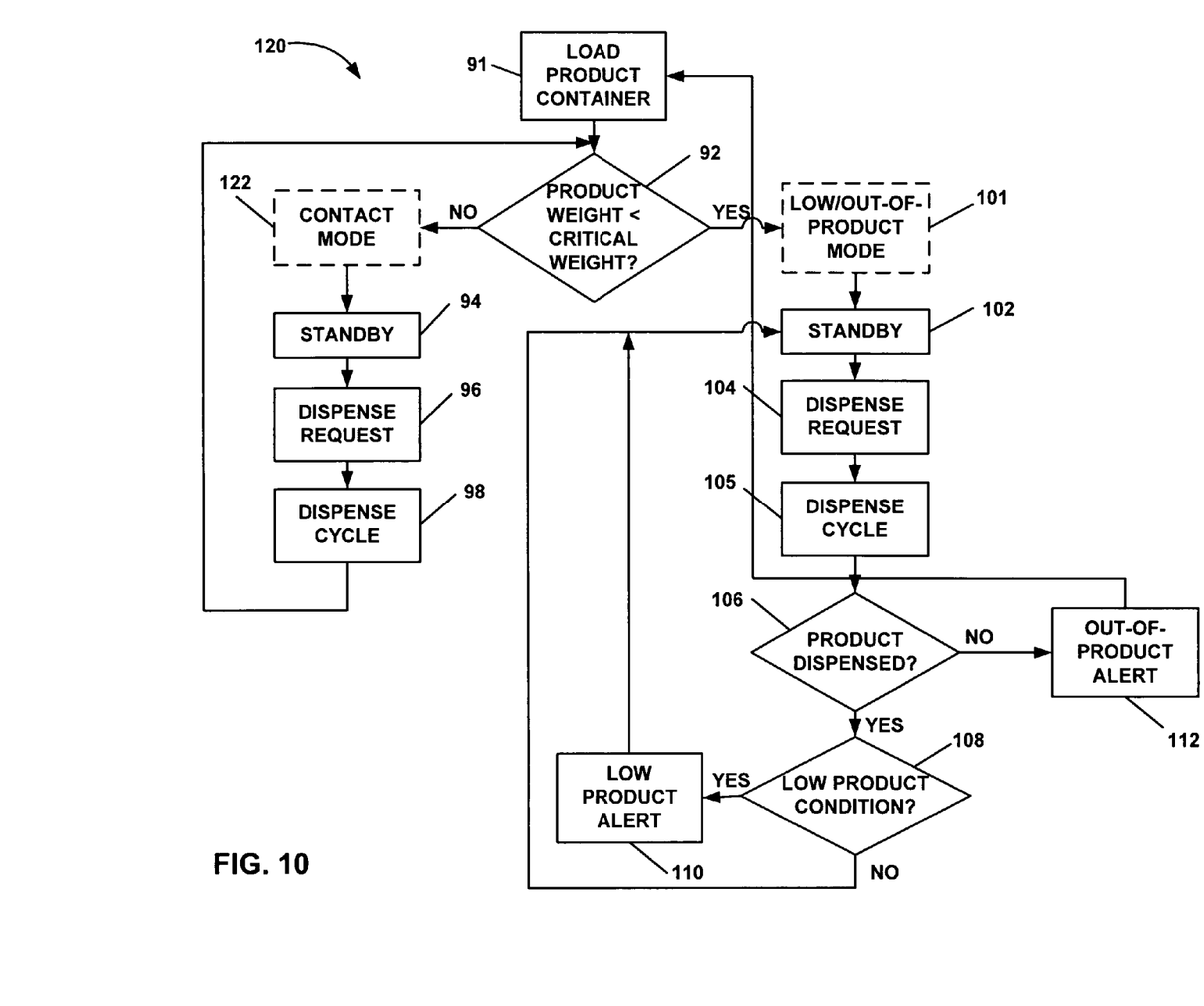
FIG. 10 is a flowchart illustrating another example process by which a controller monitors the supply of product in a container.

FIG. 10 is a flow chart illustrating another example process 120 by which controller 141 may process product weight information received from a load cell. In this example, the load cell bracket is designed to prevent further deflection of the load cell once the load cell contacts the load cell bracket.

Initially, the system may optionally be zeroed (not shown). The zeroing may be accomplished by weighing an empty product container and setting the controller to use the weight of the empty product container and/or product holder as its reference point. The zeroing may take place at the factory or after installation of the system at the site where it will be used. In yet another alternative, the controller may self-calibrate. In this alternative embodiment, after a product container is substantially empty of product and the controller senses no weight change, the weight of the substantially empty product container and/or product holder is used as the reference weight.

A product container containing product is loaded onto the product holder (91). The load cell deflects an amount corresponding to the weight of the product container at this time; any subsequent dispensing event will remove product from the product container and lighten the load on the load cell. Controller 141 receives the current product weight information from the load cell and compares it to the critical weight (92). If the product weight is not less than the critical weight (92), the load cell will deflect a sufficient distance to contact the load cell bracket. The system enters contact mode (122). In contact mode, the product weight information obtained by the load cell is not indicative of the actual weight of remaining product. This is because the load cell bracket prevents further deflection of the load cell. While in contact mode, the system does not process any product weight information received from the load cell. The system essentially waits until the product weight is less than the critical weight to enter the low/out-of-product mode (101). The system enters standby (94) and waits for a dispense request (96).

Upon receipt of a dispense request (96), the system executes a dispense cycle (98). After completion of the dispense cycle, controller 141 compares the current product weight information and subtracts the corresponding current product weight from the previous product weight. If the current weight is still greater than the critical weight, controller 141 remains in contact mode (122) as just described.

If, on the other hand, the current product weight is less than the critical weight (92), the system enters low/out-of-product mode (101). As with contact mode, in low/out-of-product mode, controller 141 enters standby (102) and waits for a dispense request (104). Upon receipt of a dispense request (104), the controller initiates a measurement program to determine the amount of product dispensed during the dispensing cycle and the weight of the remaining product. The measurement program may optionally be preceded by a programmable delay. The delay may range from 1 to 300 seconds. The length of the delay may depend on the amount of product to be dispensed, the rate the product is dispensed and the like. This delay may also be implemented in proof of delivery mode. After the optional programmable delay, the measurement program commences and determines if any product was dispensed during the dispense cycle (106).

If no weight was lost during the dispense cycle, the controller determines that no product was dispensed and generates an out-of-product notification (112). The out-of-product notification may be any suitable visual and/or auditory notification or alarm. The out-of-product notification may also be a text message displayed on an LCD or other display on user interface 142 (shown in FIG. 8). The out-of-product notification may also take the form of an e-mail, text message, cell phone or pager message or other electronic message to a user or service technician.

If the controller is configured to automatically re-zero itself, the re-zeroing may occur upon the generation of the out-of-product notification before a new product container is loaded into the product holder.

If the controller determines that the weight has changed during the product dispense cycle and that product has therefore been dispensed (106), the controller proceeds to determine if the weight of the remaining product satisfies a low product condition (108). The low product condition may be a threshold weight manually input by a user or service technician via the user interface or it may be a preprogrammed value. If the weight of the remaining product satisfies the low product condition, the controller generates a low product notification (110). The low product notification may be any suitable visual and/or auditory notification or alarm. The low product notification may also be a text message displayed on an LCD or other display on user interface 142 (shown in FIG. 8). The low product notification may also take the form of an e-mail, text message, cell phone or pager message or other electronic message to a user or service technician. The system returns to standby (102) and waits for another dispense request (104).

If the controller determines that the remaining weight of the product does not satisfy the low product condition (108), the controller determines that there is sufficient product remaining in the product container and the system returns to standby (102) and awaits another dispense request (104).

Various embodiments of the invention have been described. These and other embodiments are within the scope of the following claims.

The invention claimed is:

1. A system comprising:
   a dispenser that dispenses a product from a product container;
   a load cell that generates product weight information associated with an amount of the product remaining in the product container, the load cell having a fixed end and a free end, wherein the free end of the load cell deflects at a first rate of distance per unit load when an amount of product remaining in the product container is less than a critical load;
   a load cell bracket positioned such that the free end of the load cell contacts the load cell bracket when an amount of product remaining in the product container is greater than a critical load,
   wherein the free end of the load cell deflects at a second rate of distance per unit load when the free end of the load cell is in contact with the load cell bracket, the second rate of distance per unit load being less than the first rate of distance per unit load; and
   a controller that, when the free end of the load cell is not in contact with the load cell bracket, enters a low/out-of-product mode and determines an actual amount of product dispensed during a product dispense cycle based on the product weight information generated by the load cell;
   wherein the controller further, when the free end of the load cell is in contact with the load cell bracket, enters a proof of delivery mode, determines a measured amount of product dispensed during a dispense cycle based on the product weight information generated by the load cell and generates a proof of delivery notification when the measured amount of product dispensed during a product dispense cycle satisfies a proof of delivery threshold.

2. The system of claim 1, wherein the load cell has a maximum rated load, and wherein the critical load is substantially equal to the maximum rated load.

3. The system of claim 1 wherein the controller, when in low/out-of-product mode, generates an out-of-product notification when the determined amount of product dispensed is substantially equal to zero.

4. The system of claim 1 wherein the controller, when in low/out-of-product mode, further determines the amount of product remaining in the product container after the dispensing cycle based on the product weight information received from the load cell.

5. The system of claim 4 wherein the controller, when in low/out-of-product mode, generates a low product notification when the determined amount of product remaining satisfies a low product threshold.

6. The system of claim 1 wherein the product is one of a solid, a liquid, a powder or a paste.

7. The system of claim 1 wherein the controller, when in low/out-of-product mode, further generates at least one of an out-of-product notification or a low product notification based on the product weight information received from the load cell.

8. The system of claim 7 wherein the out-of-product notification comprises at least one of a visual notification, an auditory notification or an electronic notification.

9. The system of claim 7 wherein the low product notification comprises at least one of a visual notification, an auditory notification or an electronic notification.

10. The system of claim 1 wherein the load cell has a maximum rated deflection, and wherein the load cell bracket prevents the load cell from deflecting farther than the maximum rated deflection.

11. The system of claim 1 further comprising a memory that stores calibration data concerning a relationship between the second rate of distance per unit load and the actual amount of product remaining in the product container.

12. The system of claim 11, wherein the controller further determines the actual amount of product dispensed when the controller is in proof of delivery mode based on the measured amount of product dispensed and the calibration data.

13. The system of claim 1, wherein the measured amount of product dispensed when the controller is in proof of delivery mode is less than the actual amount of product dispensed.

14. The system of claim 1 wherein the proof of delivery notification comprises at least one of a visual notification, an auditory notification or an electronic notification.

\* \* \* \* \*